(12) United States Patent
Ohashi et al.

(10) Patent No.: US 9,021,184 B2
(45) Date of Patent: Apr. 28, 2015

(54) FLASH MEMORY DEVICE

(75) Inventors: Yosuke Ohashi, Aichi (JP); Kazunori Arakawa, Aichi (JP); Tetsuya Egawa, Aichi (JP); Hidekazu Adachi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 71 days.

(21) Appl. No.: 13/469,596

(22) Filed: May 11, 2012

(65) Prior Publication Data

US 2012/0297124 A1 Nov. 22, 2012

(30) Foreign Application Priority Data

May 20, 2011 (JP) ................................. 2011-113808

(51) Int. Cl.
*G06F 12/02* (2006.01)

(52) U.S. Cl.
CPC .... *G06F 12/0246* (2013.01); *G06F 2212/7209* (2013.01)

(58) Field of Classification Search
CPC .................. G11C 11/56; G11C 16/10; G11C 2013/0088; G06F 12/0246; G06F 2212/7209
USPC ................... 711/103, 162, E12.008; 714/763
See application file for complete search history.

(56) References Cited

U.S. PATENT DOCUMENTS

| 5,634,050 | A | * | 5/1997 | Krueger et al. ........................ 1/1 |
| 5,640,529 | A | * | 6/1997 | Hasbun .......................... 711/103 |
| 6,330,633 | B1 | * | 12/2001 | Kusakabe et al. ............. 711/103 |
| 6,845,438 | B1 | | 1/2005 | Tanaka et al. |
| 2005/0005059 | A1 | | 1/2005 | Tanaka et al. |
| 2005/0007865 | A1 | | 1/2005 | Tanaka et al. |
| 2005/0172065 | A1 | * | 8/2005 | Keays ........................... 711/103 |
| 2006/0156189 | A1 | * | 7/2006 | Tomlin .......................... 714/763 |
| 2008/0059695 | A1 | | 3/2008 | Tanaka et al. |
| 2009/0055680 | A1 | | 2/2009 | Honda et al. |
| 2009/0235017 | A1 | * | 9/2009 | Estakhri et al. ............... 711/103 |
| 2010/0023680 | A1 | | 1/2010 | Tanaka et al. |

(Continued)

FOREIGN PATENT DOCUMENTS

| JP | 9-134312 | 5/1997 |
| JP | 2006-048585 | 2/2006 |

(Continued)

OTHER PUBLICATIONS

Jas_Bakshi; what is one hot,zero one hot,zero one cold ?; May 27, 2005; http://www.edaboard.com/thread39015.html.*
Rob Van Glabbeek;n-ary and n-adic number representations; Spring 2002; http://kilby.stanford.edu/~rvg/154/handouts/n-adic.html.*
China Office Action, dated Oct. 31, 2014, in the corresponding Chinese Patent Application.

*Primary Examiner* — Nathan Sadler
*Assistant Examiner* — Ubachukwu Odunukwe
(74) *Attorney, Agent, or Firm* — Greenblum & Bernstein, P.L.C.

(57) ABSTRACT

In a flash memory device, after an updated value is copied from a first block to a second block, a block management value of the first block is set to an unused state, and maintenance is performed to erase data from the first block. When performing maintenance, the block management value of the first block B1 is rewritten from "$FFF0" to "$FFFF." When a reset occurs and the power supply is deactivated during the maintenance, the digit of "$0" in the block management value may become "1" to "E" of the hexadecimal system. In this manner, when the block management value includes a single digit of "1" to "E" and three digits of "F," the reading of an updated value from the block corresponding to the block management value is restricted.

4 Claims, 5 Drawing Sheets

$FFF0 → $FF0F → $F0FF → $0FFF

(56) References Cited

U.S. PATENT DOCUMENTS

| | | |
|---|---|---|
| 2010/0138606 A1 | 6/2010 | Tanaka et al. |
| 2011/0072332 A1* | 3/2011 | Tomlin .......................... 714/763 |
| 2012/0290770 A1* | 11/2012 | Arakawa et al. ............. 711/103 |
| 2012/0297124 A1* | 11/2012 | Ohashi et al. ................. 711/103 |
| 2014/0237205 A1* | 8/2014 | Takefman et al. ............ 711/162 |

FOREIGN PATENT DOCUMENTS

| | | |
|---|---|---|
| JP | 2007-293917 | 11/2007 |
| WO | 2007/010829 | 1/2007 |

* cited by examiner

Fig.3
$$\rightarrow \$FFF0 \rightarrow \$FF0F \rightarrow \$F0FF \rightarrow \$0FFF \rightarrow$$
Fig.4(a)
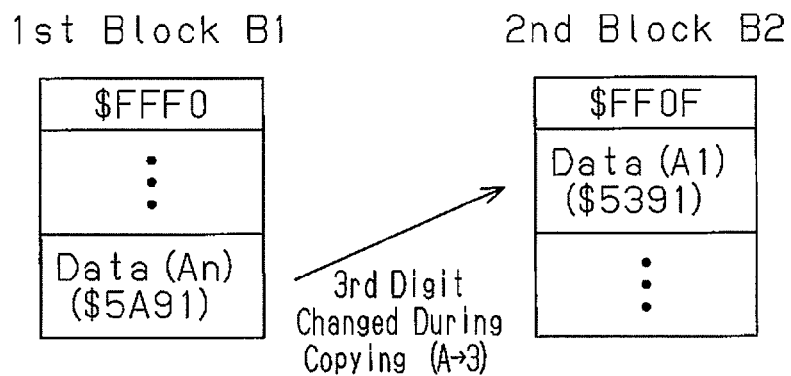
Fig.4(b)
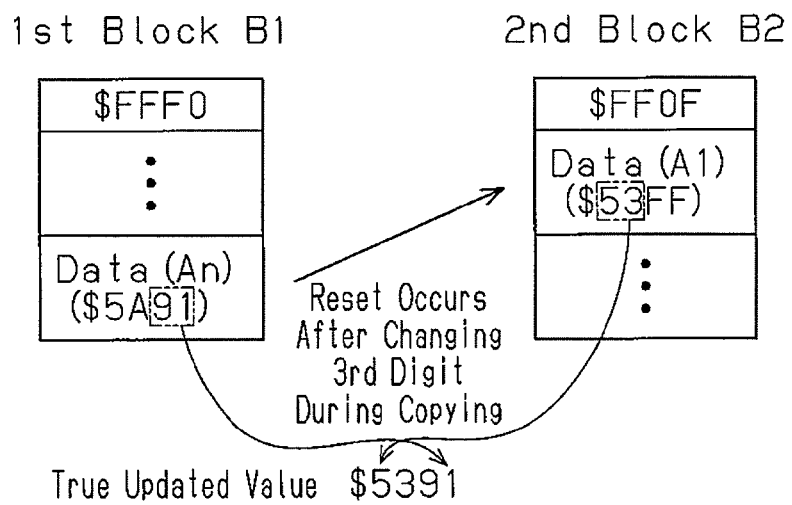

Block Management Value (Active State)

Hexadecimal System  $ F    F    F    0
Binary System       1111 1111 1111 0000

↓ Erase

Block Management Value (Unused State)

Hexadecimal System  $ F    F    F    F
Binary System       1111 1111 1111 1111

(1) Valid
$ F
1111

(2) Invalid
$ 1
000[1]

(3) Invalid
$ 2
00[1]0
⸱
$ E
1110

Reset When Changed To "1"

| Hexadecimal System | $ 0 | 0 | 0 | 1 |
|---|---|---|---|---|
| Binary System | 0 0 0 0 | 0 0 0 0 | 0 0 0 0 | 0 0 0 1 |

↓ Erase

| Hexadecimal System | $ F | F | F | F |
|---|---|---|---|---|
| Binary System | 1 1 1 1 | 1 1 1 1 | 1 1 1 1 | 1 1 1 1 |

| Hexadecimal System | $ 0 | 0 | 0 | 1 |
|---|---|---|---|---|
| Binary System | 0 0 0 0 | 0 0 0 0 | 0 0 0 0 | 0 0 0 1 |

↓ Reset During Maintenance

| Hexadecimal System | $ 0 | 0 | 0 | 3 | Discharged and Reset |
|---|---|---|---|---|---|
| Binary System | 0 0 0 0 | 0 0 0 0 | 0 0 0 0 | 0 0 1 1 | |

FLASH MEMORY DEVICE

CROSS-REFERENCE TO RELATED APPLICATIONS

This application is based upon and claims the benefit of priority from prior Japanese Patent Application No. 2011-113808, filed on May 20, 2011, the entire contents of which are incorporated herein by reference.

BACKGROUND OF THE INVENTION

The present invention relates to a flash memory device.

A flash memory device manages a memory region in blocks to shorten the time for reading data (refer to, for example, Japanese Laid-Open Patent Publication No. 9-134312). A block management value is added to each block. The block management value is information indicating whether the corresponding block is in a used state (active state) or unused state.

As shown in the example of FIG. 6, a block management value is formed by hexadecimal numbers arranged as four digits. More specifically, "$1111" is allocated as the block management value in an active state, and "$FFFF" is allocated as the block management value in a non-used state. In the description hereafter, values following "$" are hexadecimal numbers.

In detail, referring to FIG. 7, cells 10, which can be charged and discharged, are used to express the four digits of the block management value. Each cell 10 stores a single bit that is "0" when the accumulated charge is greater than or equal to a threshold Th and "1" when the accumulated charge is less than the threshold Th.

Referring to FIG. 8, four digital values of "0" or "1" obtained by the four cells 10, that is, a four-digit binary number, are used to express each of the hexadecimal digits.

A flash memory device will now be described with reference to the upper part of FIG. 6, which shows a first block in an active state and a second block in an unused state. The two blocks each include first to nth data areas A1 to An, which store data. Here, n represents a natural number. The data areas A1 to An in the unused second block are all empty and do not include data. When there is a write request for data (updated value), updated values are sequentially written to the first to nth data areas A1 to An of the first block. This reduces the empty data areas. Then, as shown in the lower part of FIG. 6, when an updated value is written to the nth data area An of the first block, the block management value of the second block is rewritten from "$FFFF", which indicates an unused state, to "$1111", which indicates an active state, and the updated value is copied to the first data area A1 of the second block. Subsequently, the data stored in the first block is completely erased, and the block management value is rewritten from "$1111", which indicates the active state to "$FFFF", which indicates the unused state. This processing is referred to as maintenance.

When an updated value is copied, the updated value may be renewed. In this case, the renewed updated value is written to the first data area A1 of the second block.

When an updated value is copied from the first block to the second block, the flash memory device may be reset when its power supply is temporarily deactivated. In this case, the first block is not switched to an unused state. Thus, when the power supply is activated again during the resetting, two blocks would be in an active state, and the updated value becomes unknown. In particular, during the copying of an updated value, renewal of the updated value would result in the updated values of the first and second blocks being different data. In this case, the true updated value is that of the second block. However, there is no means to recognize the true updated value. This may result in updated value being erroneously read from the first block.

To solve this problem, the use of serial numbers for block management values indicating active states has been discussed. More specifically, a block management value of "$1111" is allocated to the first block when the first block is in an active state. Then, a block management value of "$1112" is allocated to the second block when the second block is in an active state.

As a result, even when there are two blocks that are in active states due to a reset, the true updated value can be read from the block with the largest block management value (in this example, "$1112").

In this configuration, the maintenance described above is performed after the updated value is copied to the second block. More specifically, as shown in FIG. 9(a), the first block management value indicating an active state is rewritten to indicate an unused state. That is, the first block management value of "$0001" is rewritten to "$FFFF". Here, the cells 10 are all discharged to obtain the block management value of "$FFFF". However, the cells 10 are not discharged at the same speed. Thus, the cells 10 store the digital values of "1" in a random order. For example, referring to FIG. 9(b), among the four cells 10 corresponding to hexadecimal "1" (first digit), the cell 10 for the second digit may be the fastest one to store the digital value of "1". In this case, when a reset occurs as soon as the cell 10 for the second digit stores the digital value of "1", the bits of the four cells 10 would express the digital value of "0011", which would be "3" instead of "1" in the hexadecimal system. Thus, the block management value would be "$0003". Here, the block management value of "$0003" for the first block would be greater than the block management value of "$0002" for the second block. Accordingly, the updated value would be read from the first block when maintenance is performed, and the true updated value cannot be read.

SUMMARY OF THE INVENTION

One aspect of the present invention provides is a flash memory device including a flash memory unit and a memory control unit. The flash memory unit is provided with a plurality of blocks including first and second blocks. Each of the blocks includes a data region, which stores data, and a block management area, which stores a block management value indicating whether the corresponding block is in a used state. The block management value includes a plurality of N-adic numbers (N>2) arranged as a plurality of digits, and each of the N-adic numbers is formed by a plurality of bits. The block management area includes a plurality of cells that store the block management value, each of the cells stores a single bit of "0" when accumulated charge is greater than or equal to a threshold and stores a single bit of "1" when the accumulated charge is less than the threshold. When the block management value indicates that the corresponding block is in an unused state, the digits of the N-adic numbers are each set to an initial value formed by a plurality of bits, each of which is "1". When the block management value indicates that the corresponding block is in a used state, a specific one of the digits of the N-adic numbers is set to a specific value formed by a plurality of bits including two bits of "00". The memory control unit controls the flash memory unit. When there is a request for writing the data, the memory control unit reads the block management value from the cells in the block management area of each of the blocks and determines whether each of the blocks, including the first and second blocks, is in a used state based on the block management value. When it is determined that the blocks are in an unused state, the memory control unit writes the data to the data area of the first block and writes a first block management value to the cells in the block management area indicating that the first block is in a used state. When the data is written entirely to the data area of the first block, the memory control unit copies part of the data in the first block to the data area of the second block that is in an unused state, writes a second block management value to the cells of the block management area in the second block indicating that the second block is in a used state, writes a block management value to the block management area of the first block that was determined as being in the used state indicating that the block is in an unused state, and erases the data from the data area of the first block. The memory control unit sets the second block management value so that the specific value of the second block management value is located at a position that differs from that of the first block management value. When the first and second blocks are in a used state, the memory control unit determines that updated data is written to the second block based on the positions of the two specific values in the first and second block management values and reads the updated data from the data area of the second block. When the block management value of the second block includes a value other than the initial value and the specific value, the memory control unit restricts the reading of the data from the second block.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a diagram showing an order in which block management values are added to active blocks;

FIG. 4(a) is a memory map showing blocks when an updated value is renewed during copying;

FIG. 4(b) is a memory map showing the blocks when the flash memory device is reset during the task of FIG. 4(a);

DETAILED DESCRIPTION OF THE INVENTION

One embodiment of a flash memory device according to the present invention will now be described with reference to FIGS. 1 to 5.

Figure 1:
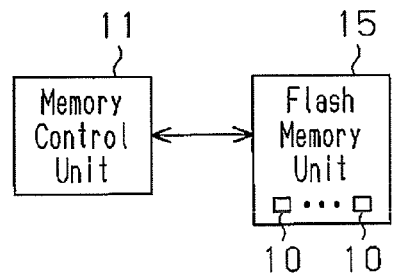
FIG. 1 is a diagram showing the configuration of a flash memory device.

As shown in FIG. 1, the flash memory device includes a memory control unit 11 and a flash memory unit 15, which is a non-volatile memory. The memory control unit 11 includes a plurality of cells 10. As described in the prior art section, the flash memory unit 15 stores a single bit of "0" or "1" in each of the cells 10.

The memory control unit 11 uses the flash memory unit 15 to store an updated value. The memory control unit 11 recognizes the updated value in accordance with information from an external device (not shown).

Figure 2:
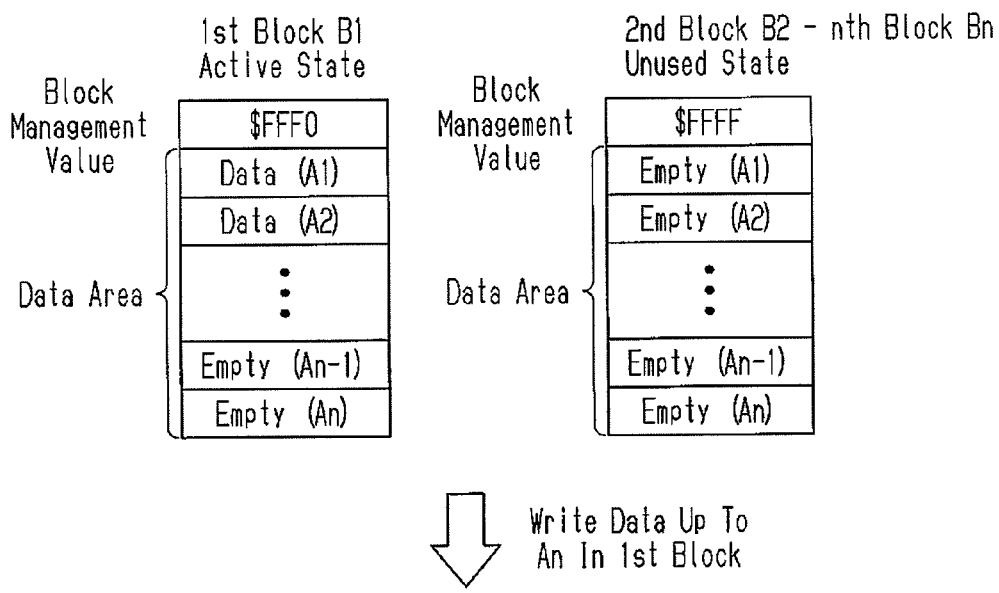
FIG. 2 is a memory map showing blocks and their block management values.
Figure 2:
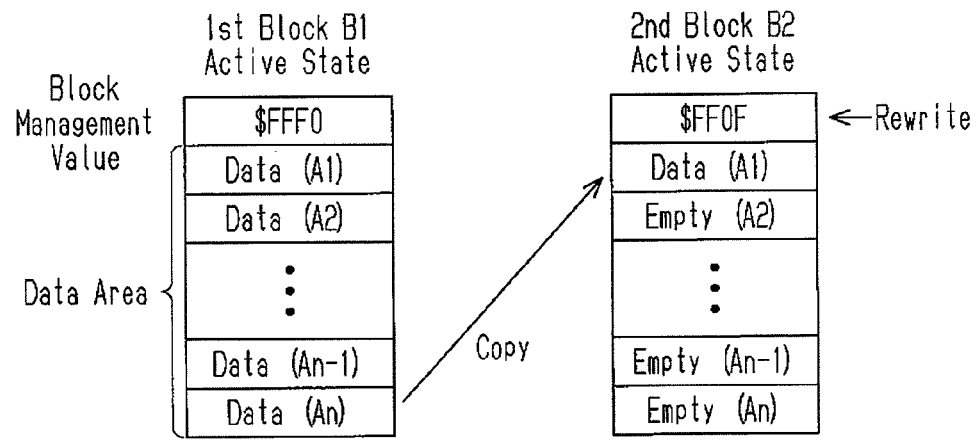

As shown in FIG. 2, the flash memory unit 15 includes a data region, which is divided into a plurality of blocks B1 to Bn. The memory control unit 11 manages the data region in block units. The blocks B1 to Bn, respectively, include first to nth block management areas and first to nth data areas A1 to An. A block management value is formed by hexadecimal numbers arranged as four digits. More specifically, referring to FIG. 2, "$FFF0", "$FF0F", "$F0FF", and "$0FFF" are sequentially allocated as the block management values in an active state. In this example, a different block management value is added to each block in an active state. Further, "$FFFF" is allocated to each block in an unused state. In this example, "F" corresponds to an initial value, and "0" corresponds to a "specific value".

In the same manner as a block management value, an updated value is also formed by a hexadecimal numbers arranged as a plurality of digits. As described in the prior art section, digital values of a plurality of bits obtained from the cells 10 are used to express a hexadecimal number.

In a state in which each of the blocks B1 to Bn store no data, the memory control unit 11 writes "$FFFF" as the block management value in each block management area to indicate an unused state. In this state, when recognizing an updated value, the memory control unit 11 writes the updated value to the first data area A1 of the first block B1 and rewrites the block management value stored in the first block management area from "$FFFF", which indicates an unused state, to "$FFF0", which indicates an active state. In the same manner, the memory control unit 11 sequentially writes updated values to the second to nth data values A2 to An. Old updated values are not erased. Further, the block management value stored in the first block management area is held as "$FFF0".

As shown in the lower part of FIG. 2, when an updated value is written to the nth data area An of the first block B1, the memory control unit 11 rewrites the block management value stored in the second block management area of the second block B2 from "$FFFF", which indicates an unused state, to "$FF0F", which indicates an active state. The block management value of "$FF0F", which is stored in the second block management area of the second block B2 and indicative of an active state, is obtained by shifting "0" by one digit toward the left from the first block management value of "$FFF0", which is stored in the first block management area of the first block B1.

Further, the memory control unit 11 copies the updated value of the first block B1 to the first data area A1 of the second block B2. Then, the memory control unit 11 erases the data stored in the first block B1 and rewrites the block management value stored in the first block management area from "$FFF0", which indicates an active state, to "$FFFF", which indicates an unused state. This processing is referred to as maintenance.

In the same manner as the first block, when an updated value is written to the nth data area An of the second block B2, the memory control unit 11 rewrites the block management value stored in the third block management area of the third block B3 from "$FFFF", which indicates an unused state, to "$F0FF", which indicates an active state. Further, the memory control unit 11 copies the updated value of the second block B2 to the first data area A1 of the third block B3. Then, the second block B2 undergoes maintenance. Subsequently, in the same manner, when the fourth block B4 enters an active state, the memory control unit 11 writes the block management value of "$0FFF" to the fourth block management area of the fourth block B4, and performs maintenance on the third block B3. Then, when the fifth block B5 enters an active state, the memory control unit 11 writes the block management value of "$FFF0" again to the fifth block management area of the fifth block B5, and performs maintenance on the fourth block B4. In this manner, as shown in FIG. 3, by shifting "0" toward the left by one digit at a time, a plurality of block management values are stored in the blocks B1 to Bn in the order shown by the arrows.

The memory control unit writes updated values up to an n−1th data area An−1 of the first block B1. When the next updated value is too large and cannot be stored in the nth data area An, this updated value is written to the second block B2. In this case, the first and second data areas A1 and A2 of the second block B2 are used.

After copying an updated value of a certain block to a data area of the next block, the block management value of "$FFFF", which indicates an unused state, is written to the block management value of the certain block. Thus, in the above configuration, basically, only one block is in an active state. This allows for the memory control unit 11 to read an updated value from the block that is in an active state.

However, when copying an updated value, the flash memory device may be reset when its power supply is temporarily deactivated. For example, in the case shown in the lower part of FIG. 2, the rewriting of the block management value has been completed for the second block B2 but not for the first block B1. Thus, two blocks are in active states.

Here, the block management area of each block stores a different block management value in an active state. If there is a plurality of active blocks when reading the updated value, the memory control unit 11 reads the updated value based on the position of the "0" in the block management value. For example, when the block management value is "$FFF0" for the first block B1 and "$FF0F" for the second block B2, the memory control unit 11 determines from the order in which the block management values are added as shown in FIG. 3 that "$FF0F" is newer than "$FFF0" and reads the updated value in the second block B2, which corresponds to "$FF0F". In this manner, the order for adding the block management values is stored beforehand in a memory (not shown), which is incorporated in the memory control unit 11.

As shown in FIG. 4(a), when the updated value of the first block B1 is being copied to the second block B2, the updated value may be renewed. Here, the renewed updated value is referred to as a true updated value. When an updated value that is being copied is renewed, the memory control unit 11 writes the true updated value to the second block B2. Here, the updated value is copied in order from leftward digits. In the example of FIG. 5(a), when copying the fourth digit from the right, namely, "5", if the memory control unit 11 recognizes that the third digit has been renewed from "A" to "3", the memory control unit 11 writes the renewed "3" to the third digit. As a result, the true updated value of "$5391" is written to the second block B2.

Under the above situation, referring to FIG. 4(b), the flash memory device may be reset when the second digit from the right, namely, "9", is being written. In this case, the copying of the fourth and third digits ("5" and "3") has been completed. However, the copying of the remaining two digits of "9" and "1" has not been completed. Thus, the remaining two digits are in an initial state of "F".

In this state, when reading the updated value after the power supply is activated again, the memory control unit 11 first reads the updated value of "53FF" from the second block B2 based on the greater one of the first and second block management values in the first and second block management areas. When the updated value includes an "F", the memory control unit 11 determines that the flash memory device has been reset when copying the updated value and complements the digits of "F" with the updated value of the first block B1 ("9" and "1"). Thus, the memory control unit 11 reads the updated value in a correct order even when two blocks are indicated as being in an active state. In this example, the updated value of the first block B1 is prevented from being first read. That is, an updated value that differs from the true updated value is prevented from being read. This ensures that the true updated value is read.

Further, when a block management value indicating an active state includes any one of "1" to "E" instead of "0", the memory control unit 11 restricts the reading of an updated value from the block of that block management value.

For example, when maintenance is performed, the block management value of "$FFF0", which indicates an active state, is rewritten to "$FFFF", which indicates an unused state. In this case, as shown by circled numeral 1 in FIG. 5, the first digit of "$0" in the block management value is rewritten to "1" by rewriting the binary digital value of "0000" to the digital value of "1111". This rewrites the first digit to "$F".

Here, the cells 10 are not discharged at the same speed. Thus, the four cells 10 store the digital values of "1" in a random order. In this case, when the block management value is rewritten to indicate an unused state, the first digit of the block management value, namely, "$0" would be rewritten to "$1" if a reset occurs when the binary digital value of "0000" has been rewritten to the digital value of "0001". In this manner, one of "$FFF1" to "$FFFE" may be set as the block management value.

Figure 5:
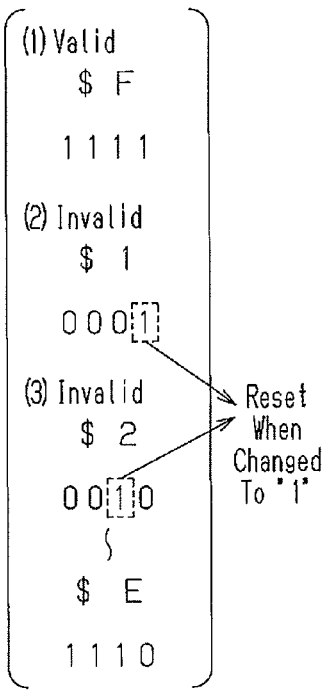
FIG. 5 is a diagram showing a block management value during maintenance.
Figure 6:
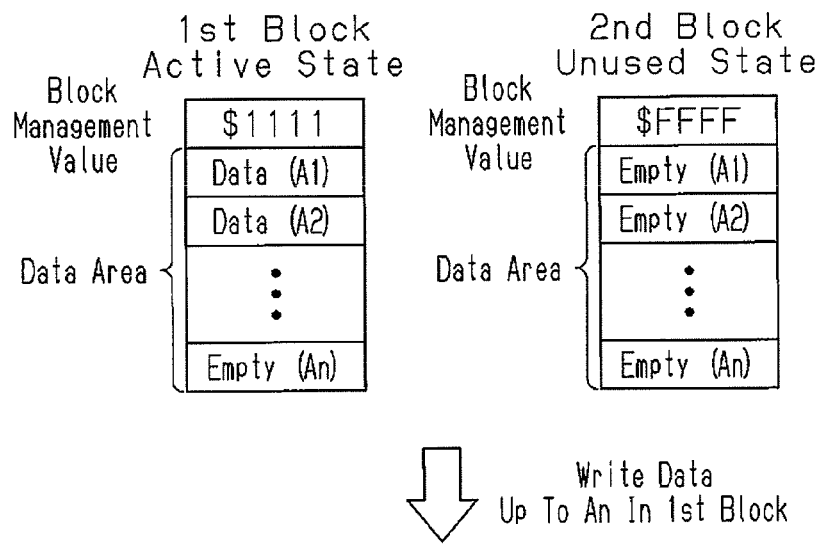
FIG. 6 is memory map showing blocks and their block management values in the prior art.
Figure 7:
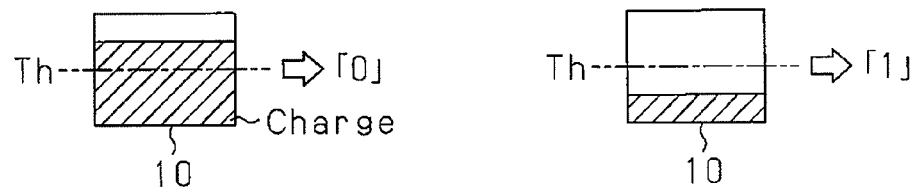
FIG. 7 is a schematic diagram showing cells in the prior art.
Figures 8, 9A, 9B:
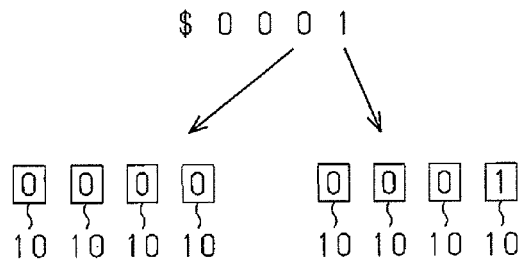
FIG. 8 is a diagram showing how a plurality of cells express a hexadecimal number in the prior art.
FIG. 9(a) is a diagram showing a block management value obtained during normal maintenance.
FIG. 9(b) is a diagram showing a block management value obtained when a reset occurs during maintenance.

More specifically, as shown by circled numeral 2 in FIG. 5, if a reset occurs when the first digit of the binary digital value "0000" becomes "1", the block management value of "$FFF1" is written to the block management area. As shown by circled numeral 3 in FIG. 5, if a reset occurs when the second digit of the binary digital value "0000" becomes "1", the block management value of "$FFF2" is written to the block management area. Other combinations of the four digits in a binary value would obtain the block management values of "$FFF3" to "$FFFE".

When, for example, the block management values of "$FFF1" to "$FFFE" are stored in the first block management value of the first block B1, the reading of an updated value from the block having such a block management value is restricted, and an updated value is read from the second block B2. The block in which reading of an updated value is restricted is assumed as undergoing maintenance and is inappropriate as a subject from which the updated value is read. Accordingly, erroneous reading of the updated value from the first block B1 when a reset occurs during maintenance is suppressed. This further ensures the reading of the true updated value.

Then, when the power supply is re-activated, the cells 10 are discharged again so that the memory control unit 11 writes the block management value of "$FFFF" to the first block management area in the first block B1.

The present embodiment has the advantages described below.

(1) After an updated value is copied from the first block B1 to the second block B2, the block management value, which indicates an active state, of the first block management area in the first block B1 is re-written to indicate an unused state. Further, maintenance is performed to erase data from the first block B1. In this manner, when maintenance is performed, the block management value of "$FFF0" of the first block management area in the first block B1 is rewritten to "$FFFF". More specifically, the four cells 10 corresponding to "$0" in the block management value are discharged, and the four cells 10 store the digital value of "1". The cells 10 are not discharged at the same speed. Thus, the four cells 10 store the digital value of "1" in a random order. As a result, when a reset occurs during maintenance causing the power supply to be deactivated, the digit of "$0" in the block management value may be rewritten to any one of "1" to "E" in the hexadecimal system. In this manner, when the block management value includes one digit of any one of "1" to "E" and three digits of "F", the reading of an updated value from the block having that block management value is restricted. Thus, even when a reset occurs during maintenance, the updated value is prevented from being erroneously read from the block that is undergoing maintenance. This ensures that the true updated value is read.

(2) When an updated value is copied from the first block B1 to the second block B2 and the updated value is renewed, the renewed true updated value is written to the second block B2. For example, when the flash memory device is reset during the copying, the updated value of the second block B2 is read based on the position of the "0" in the block management value. Further, the updated value of the first block B1 is read to complement regions to which the updated value has not been copied. Thus, the true updated value that is renewed can be read even when the flash memory device is reset after copying the renewed part of the updated value.

(3) When an updated value is written to the n−1th data area An−1 of the first block B1 and the next updated value is too large and cannot be stored in the nth data area An, this updated value is written to the second block B2. Under this situation, when the flash memory device is reset after copying is completed, the first and second blocks B1 and B2 have different updated values. Even in such a case, the updated value of the second block B2 is correctly read based on the position of the "0" in the block management value.

(4) As long as there is an order of priority based on the position of the "0" in the block management value like in the above embodiment, the same process can always be performed even when two blocks have the same updated value. This differs from the prior art in which the same block management value is used to indicate an active state.

It should be apparent to those skilled in the art that the present invention may be embodied in many other specific forms without departing from the spirit or scope of the invention. Particularly, it should be understood that the present invention may be embodied in the following forms.

In the above embodiment, the block management value is formed by four digits of hexadecimal numbers. However, the block management value is not limited to hexadecimal numbers and may be, for example, octal numbers, decimal numbers, or duotrigesimal numbers. When using the duotrigesimal system, the block management value is formed by numbers arranged as five digits, and an initial mark is "V" in which the cells corresponding to a block management value are all "0". Thus, different block management values indicating an active state are added to the blocks in the order of "VVVV0", "VVV0V", and so on.

In the above embodiment, as shown in FIG. 3, the block management values of "$FFF0", "FF0F", "$F0FF", and "$0FFF" indicating active states are written in order to the block management areas. However, the order is not limited to that of the above example as long as the order is determined beforehand.

In the above embodiment, the position of the "0" is shifted leftward one digit at a time in block management values added to blocks in the active state. However, the shifted subject does not have to be "0" as long as it is a hexadecimal number expressed by two or more "0s" in a four-digit binary number. More specifically, the shifted number may be any number other than "7", "B", "D", "E", and "F".

For example, "3" may be shifted instead of "0". Here, "3" is expressed as "0011" in the binary system. In this case, when a reset occurs during maintenance, a binary number of "0111" or "1011" may be obtained. The binary number of "0111" is the hexadecimal number of "7", and the binary number of "1011" is the hexadecimal number of "B". Thus, when a block management value indicating an active state is, for example, "$3337" or "$333B", the reading of an updated value from that block is restricted.

The present examples and embodiments are to be considered as illustrative and not restrictive, and the invention is not to be limited to the details given herein, but may be modified within the scope and equivalence of the appended claims.

The invention claimed is:

1. A flash memory device, comprising:
a flash memory provided with a plurality of blocks including first and second blocks, wherein
each of the blocks includes a data region, which stores data, and a block management area, which stores a block management value indicating whether a corresponding block is in a used state,
the block management value includes a plurality of N-adic numbers (N>2) arranged as a plurality of digits, and each of the N-adic numbers is formed by a plurality of bits,
the block management area includes a plurality of cells that store the block management value, each of the cells stores a single bit of "0" when an accumulated charge is greater than or equal to a threshold and stores a single bit of "1" when the accumulated charge is less than the threshold,
when the block management value indicates that the corresponding block is in an unused state, the digits of the N-adic numbers are each set to an initial value formed by the plurality of bits, wherein each bit is "1",
when the block management value indicates that the corresponding block is in the used state, a specific one of the digits of the N-adic numbers is set to a specific value formed by the plurality of bits including two bits of "00", and the digits of the N-adic numbers other than the specific one of the digits of the N-adic numbers are maintained at the initial value; and
a memory controller that controls the flash memory, wherein
when there is a request for writing the data to the flash memory, the memory controller reads the block management value from the cells in the block management area of each of the blocks and determines whether each of the blocks, including the first and second blocks, is in the used state based on the block management value,
when the memory controller determines that the blocks are in the unused state, the memory controller writes the data to the data area of the first block and writes a first block management value to the cells in the block management area indicating that the first block is in the used state, when the data is entirely written to the data area of the first block, the memory controller copies part of the data in the first block to the data area of the second block that is in the unused state, writes a second block management value to the cells of the block management area in the second block indicating that the second block is in the used state, writes the block management value to the block management area of the first block indicating that the block is in the unused state, and erases the data from the data area of the first block, the memory controller sets the second block management value so that the specific value of the second block management value is located at a position that differs from a position of the first block management value, when the first and second blocks are in the used state, the memory controller determines that updated data is written to the second block based on positions of each of the specific values in the first and second block management values and reads the updated data from the data area of the second block, and when the block management value of the second block includes the initial value, and a value of the N-adic numbers other than both the initial value and the specific value, the memory controller restricts the reading of the data from the second block.

2. The flash memory device according to claim 1, wherein the block management value includes four digits of hexadecimal values, the initial value is "F" of the hexadecimal system, and
the specific value is "0" of the hexadecimal system.

3. The flash memory device according to claim 1,
wherein when the part of the data copied from the data area of the first block to the data area of the second block is renewed, the memory controller renews the data copied to the data area of the second block.

4. The flash memory device according to claim 1, wherein when a reset occurs during the copying, the memory controller reads the data copied to the data area of the second block in accordance with the positions of the two specific values in the first and second block management values, the memory controller determines whether the copying has been completed in accordance with the read data, and when the memory controller determines that the copying has not been completed, the memory controller rewrites the data copied to the data of the second block with the part of the data in the data area of the first block.

* * * * *